April 1, 1947.  A. J. HARLAMOFF  2,418,258
CENTRIFUGAL PUMP
Filed Aug. 18, 1944
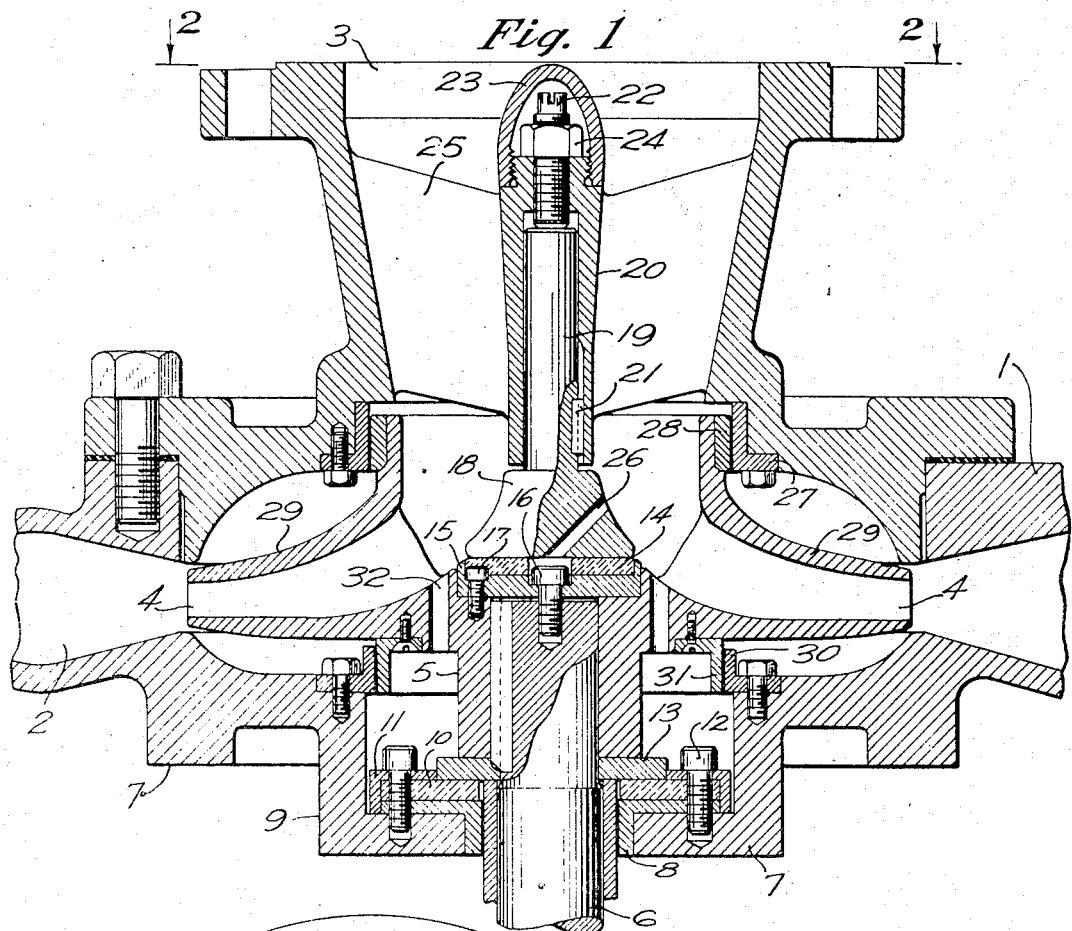
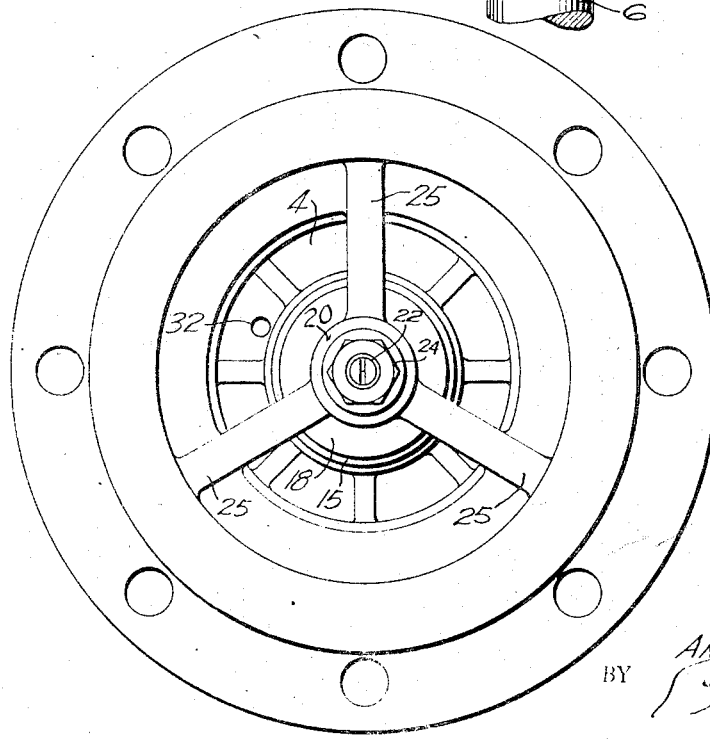
INVENTOR.
ANATOL J. HARLAMOFF
BY
ATTORNEY Patented Apr. 1, 1947

2,418,258

UNITED STATES PATENT OFFICE 2,418,258

CENTRIFUGAL PUMP

Anatol J. Harlamoff, South Gate, Calif., assignor to A. O. Smith Corporation, Milwaukee, Wis., a corporation of New York Application August 18, 1944, Serial No. 550,041

3 Claims. (Cl. 103—111)

This invention relates to a centrifugal pump and more particularly to the construction of the axial thrust bearings therefor.

One of the principal objects of the invention is to reduce the wear on the axial thrust bearings.

Another object of the invention is to provide for lubrication of the principal bearing by the fluid being pumped.

Another object is to simplify the construction of the pump to thereby facilitate assembly and bearing adjustment.

Other objects will appear hereinafter in connection with the description of a preferred embodiment of the invention illustrated in the accompanying drawing.

In the drawing:

Figure 1 is an axial section through the pump; and

Fig. 2 is an end view looking into the nozzle on line 2—2 of Figure 1, with the cap removed.

The pump comprises a housing 1 containing a volute discharge passage 2 and having a suction nozzle 3 secured to its forward side to provide therewith an enclosure for the centrifugal impeller 4.

The impeller 4 has a hub 5 of substantial length keyed upon the end of the pump shaft 6 which extends through the rear wall 7 of housing 1 to be driven by a motor or other suitable means, not shown.

The wall 7 has a flanged cylindrical wear ring 8 disposed in the opening for shaft 6 and adapted to closely encircle a sleeve on the shaft to seal the same. The wall 7 also has an intermediate cylindrical portion 9 which houses the rear thrust bearing disc 10.

The bearing disc 10 is made of carbon or metal impregnated carbon such as "Morganite" and held in place by a flanged cylindrical outer casing 11 into which it is pressed in manufacture. Bolts 12 pass through the flange of casing 11, through the carbon bearing disc 10, through the flange of wear ring 8 and into the rear wall 7 of housing 1 to secure the members together.

The bearing disc 10 has a portion of its front surface exposed to be engaged by a bearing plate 13 keyed to shaft 6 at the inner end of impeller hub 5. The bearing 10 thus serves to limit the rearward movement of impeller 4 and of shaft 6.

The forward thrust bearing 14 comprises a circular disc of similar carbon material mounted in a flanged plate 15 secured to the flat end of shaft 6 by central bolt 16. The diameter of plate 15 is larger than that of shaft 6 so that the plate overhangs the front of the impeller hub 5 and prevents the latter from coming off the end of the shaft. The plate 15 may be additionally secured to the hub 5 by bolts 17.

The bearing disc 14 has its entire front surface exposed to be engaged by the flat rear surface of a central bearing block 18 which has a cylindrical forwardly extending support 19 held in a hollow central plug 20. A key 21 between support 19 and plug 20 prevents the block 18 from turning.

The bearing clearances for both bearings 10 and 14 are adjusted by an adjusting screw 22 at the forward end of plug 20 and which presses axially against the end of support 19. A stream lined cap 23 is threaded onto the forward end of plug 20 to cover the screw 22 and its lock nut 24.

The plug 20 is held axially of nozzle 3 by radial webs 25 integrally cast with it and the nozzle.

The forward bearing 14 may be lubricated by the fluid being pumped by providing a diagonal passage 26 through block 18 to the center of the bearing. Fluid passes from the pump intake through passages 26 to the center of the bearing and from thence it is thrown radially outward between the bearing surfaces of disc 14 and block 18 as the disc 14 rotates.

By disposing the principal thrust bearing close to the center of hub 5 and shaft 6 the actual speed of movement of one bearing surface over the other is reduced to a minimum. The adjustment of the bearing tightness by screw 22 also serves to adjust the tightness of bearing 10 and to hold the impeller 4 in place.

Suitable cylindrical wear rings 27 and 28 secured on the nozzle 3 and front shroud 29 of impeller 4, respectively, serve to seal the impeller against leakage of fluid pressure along its forward side. Similar wear rings 30 and 31 secured on the rear wall 7 and rear face of the impeller 4, respectively, serve to seal the impeller against leakage of fluid pressure along its rear side and through the bearing 10. A passage 32 through the impeller near its hub 5 serves to provide a suction on the rear side of the impeller and effect lubrication of the wear rings 30 and 31 by a restricted flow of pumped fluid therethrough.

By constructing the respective pairs of wear rings of the same diameter and size the impeller may be substantially balanced as to external axial forces. This reduces wear on the bearings 10 and 14.

By constructing bearings 10 and 14 of carbon, as described, the bearings wear indefinitely and do not gall.

The invention may have various embodiments within the scope of the accompanying claims.

I claim:

1. In a pump of the class described having an impeller with its hub mounted on the end of a shaft, a non-galling disc bearing element mounted on the forward side of the hub in axial alignment with the shaft, an intake nozzle for the impeller having webs carrying a hollow tubular member in axial alignment with the shaft and spaced in front of said bearing disc, a bearing block bearing against the face of said disc, a shank for supporting said block and extending into said tubular member, and means adjustably determining the longitudinal position of the shank in said tubular member to adjust the bearing provided by said disc and block.

2. In a pump of the class described having an impeller with its hub mounted on the end of a shaft, a non-galling disc bearing element mounted on the forward side of the hub in axial alignment with the shaft, an intake nozzle for the impeller having webs carrying a hollow tubular member in axial alignment with the shaft and spaced in front of said bearing disc, a bearing block bearing against the face of said disc, a shank for supporting said block and extending into said tubular member, and a threaded stud in the forward end of the tubular member and bearing axially against the end of the shank to adjust the bearing provided by the disc and block.

3. In a pump of the class described having an impeller with its hub mounted on the end of a shaft, a non-galling forward disc bearing element mounted on the forward side of the hub in axial alignment with the shaft, an intake nozzle for the impeller having webs carrying a hollow tubular member in axial alignment with the shaft, and spaced in front of said bearing disc, a bearing block bearing against the face of the disc, a shank for supporting said block and extending into said tubular member, a rearward thrust bearing disposed at the rear end of the hub to resist rearward axial thrust of the impeller, and means adjustably determining the longitudinal position of the shank in said tubular member to adjust both the forward and rearward thrust bearing.

ANATOL J. HARLAMOFF.

REFERENCES CITED

The following references are of record in the file of this patent:

UNITED STATES PATENTS

| Number | Name | Date |
|---|---|---|
| 1,100,327 | Remington | June 16, 1914 |
| 1,132,413 | Whipple | Mar. 16, 1915 |
| 1,340,091 | Trane | May 11, 1920 |

FOREIGN PATENTS

| Number | Country | Date |
|---|---|---|
| 3,076 | French | Feb. 9, 1903 |